United States Patent
Iwamura et al.

(10) Patent No.: US 8,811,425 B2
(45) Date of Patent: Aug. 19, 2014

(54) MOBILE COMMUNICATION METHOD, RADIO BASE STATION, AND MOBILE STATION

(75) Inventors: Mikio Iwamura, Tokyo (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 70 days.

(21) Appl. No.: 13/390,989

(22) PCT Filed: Aug. 13, 2010

(86) PCT No.: PCT/JP2010/063765
§ 371 (c)(1),
(2), (4) Date: Mar. 29, 2012

(87) PCT Pub. No.: WO2011/021585
PCT Pub. Date: Feb. 24, 2011

(65) Prior Publication Data
US 2012/0176983 A1      Jul. 12, 2012

(30) Foreign Application Priority Data
Aug. 17, 2009   (JP) ................. P2009-188792

(51) Int. Cl.
*H04J 3/16*       (2006.01)
(52) U.S. Cl.
USPC ........... 370/468; 370/329; 370/252; 370/387; 370/390
(58) Field of Classification Search
USPC ................. 370/329, 445, 468, 252, 487, 490
See application file for complete search history.

(56) References Cited

U.S. PATENT DOCUMENTS

| 7,852,743 | B2 * | 12/2010 | Kwon et al. ................ 370/203 |
| 7,912,471 | B2 * | 3/2011 | Kodikara Patabandi et al. ................ 455/450 |
| 7,979,769 | B2 * | 7/2011 | Chun et al. ................ 714/748 |
| 8,031,668 | B2 * | 10/2011 | Wang et al. ................ 370/329 |
| 8,194,559 | B2 * | 6/2012 | Chun et al. ................ 370/252 |
| 8,229,517 | B2 * | 7/2012 | Lee et al. ................ 455/574 |
| 8,347,174 | B2 * | 1/2013 | Chun et al. ................ 714/758 |
| 2009/0137258 | A1 * | 5/2009 | Nguyen ................ 455/466 |
| 2009/0316633 | A1 * | 12/2009 | Kato et al. ................ 370/329 |
| 2009/0316638 | A1 * | 12/2009 | Yi et al. ................ 370/329 |
| 2010/0041370 | A1 * | 2/2010 | Narasimha et al. .......... 455/410 |

FOREIGN PATENT DOCUMENTS

WO    2010/057540 A1    5/2010

OTHER PUBLICATIONS

IPWireless;("RRC connection establishment procedure for E-UTRA");2006;3GPP TSG RAN WG2 #50; pp. 1-8.*

(Continued)

*Primary Examiner* — Ricky Ngo
*Assistant Examiner* — Dewanda Samuel
(74) *Attorney, Agent, or Firm* — Osha Liang LLP

(57) ABSTRACT

A mobile communication system according to the present invention includes: a step A in which a mobile station UE transmits an uplink data signal using a shared uplink resource designated by an uplink scheduling grant to a radio base station eNB upon reception of the uplink scheduling grant including CB-RNTI; a step B in which the radio base station eNB transmits a downlink control signal including the CB-RNTI upon successful reception of the uplink data signal transmitted by the mobile station UE; and a step C in which the radio base station eNB transmits MAC-CE including C-RNTI of the mobile station UE using a downlink resource designated by the downlink control signal.

16 Claims, 4 Drawing Sheets

(56) References Cited

OTHER PUBLICATIONS

Mediatek, et al., "Discussion on the Retransmission of Contention-Based Transmission," R2-100174, 3GPP TSG-RAN WG2 #68bis, Valencia, Spain, Jan. 18-22, 2010, 3 pages.

ETRI, "The handling of CB uplink transmission," R2-100215, 3GPP TSG RAN WG2 #68bis, Valencia, Spain, Jan. 18-22, 2010, 3 pages.

Ericsson, St-Ericsson, "Contention based uplink transmissions," R2-093812, 3GPP TSG-RAN WG2 #66bis, Los Angeles, USA, Jun. 29-Jul. 3, 2009, 4 pages.

International Search Report issued in PCT/JP2010/063765, mailed on Sep. 14, 2010, with translation, 4 pages.

Written Opinion issued in PCT/JP2010/063765, mailed on Sep. 14, 2010, 4 pages.

\* cited by examiner

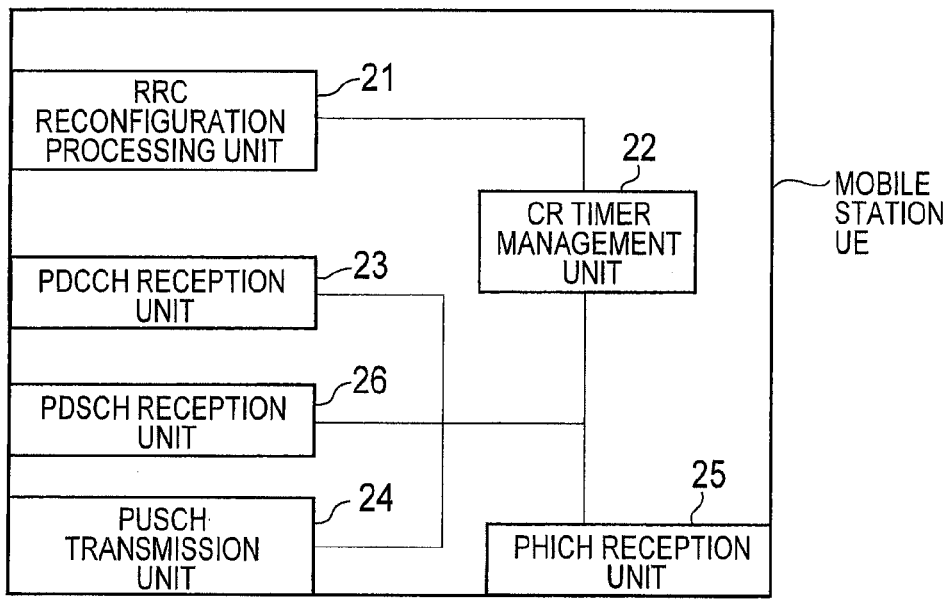
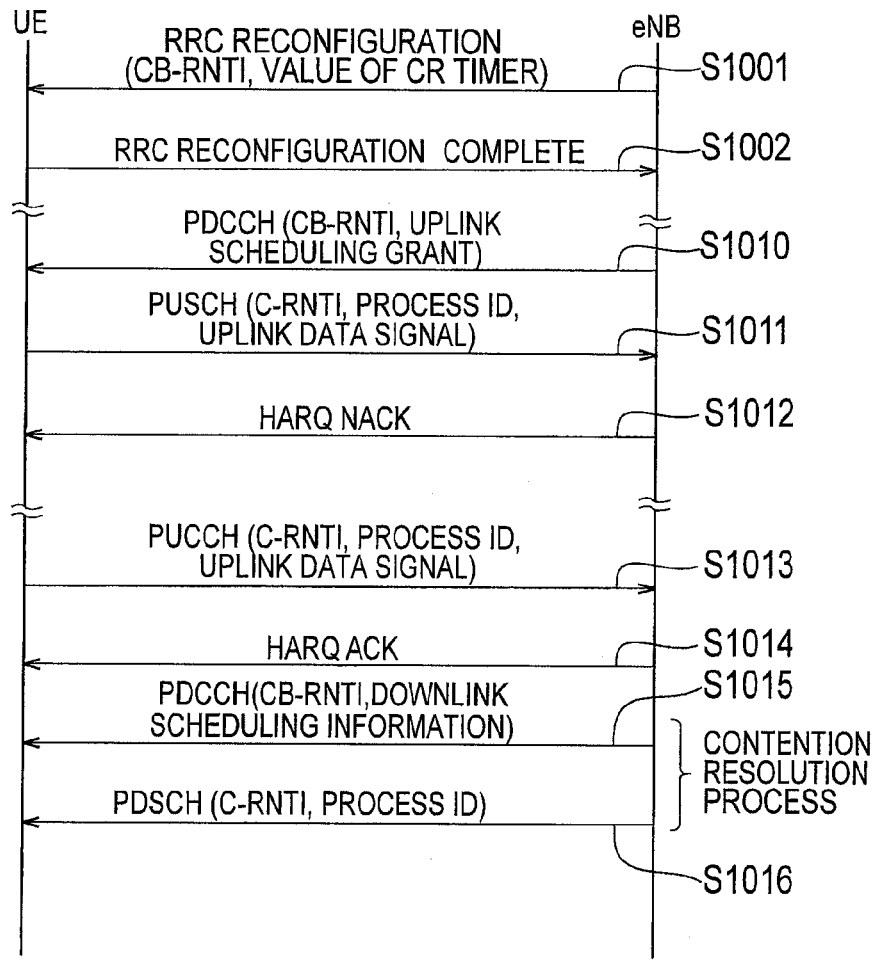

FIG. 5

MAC HEADER

| R | R | E | LCID |
|---|---|---|------|

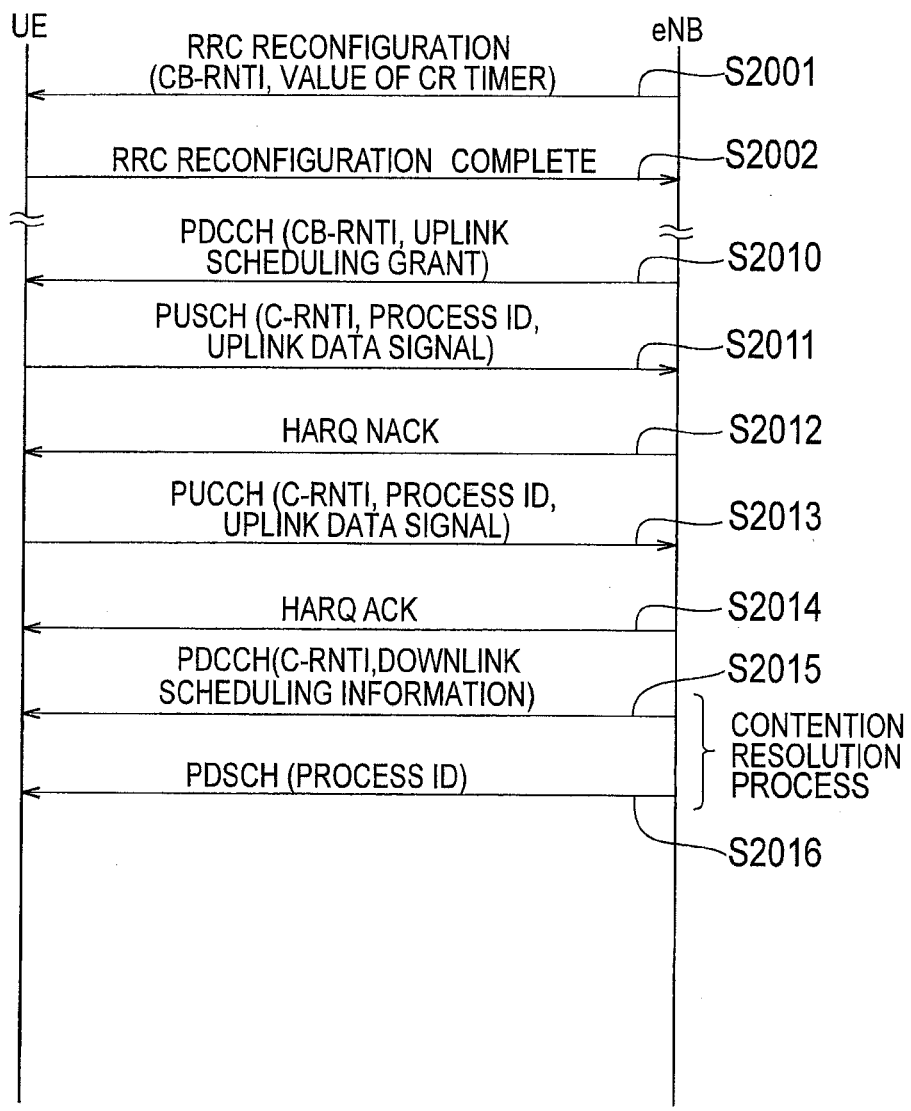

US 8,811,425 B2

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

The Standards Determination Committee for LTE (Long Term Evolution)-Advanced schemes has proposed adaptation of a contention-based uplink transmission control method using "Contention Based Grant" (see Non-Patent Document 1). A contention-based uplink transmission control method using the "Contention Based Grant" will be simply described below.

Firstly, in addition to an uplink scheduling grant transmitted through PDCCH (Physical Downlink Control Channel) addressed to C-RNTI (Cell-Radio Network Temporary Identity) of a mobile station UE, the mobile station UE can monitor and receive an uplink scheduling grant transmitted though the PDCCH addressed to CB-RNTI (Contention Based-Radio Network Temporary Identity).

Secondly, when the mobile station UE has received an uplink scheduling grant transmitted though PDCCH addressed to CB-RNTI, an uplink data signal is transmitted through PUSCH (Physical Uplink Shared Channel) using TF (Transmission Format), MCS (Modulation and Code Scheme), RB (Resource Blocks) or the like that are designated by the uplink scheduling grant.

The mobile station UE adds "MAC CE (Control Element)" including the C-RNTI of the mobile station UE to the uplink data signal to enable identification of by whom the uplink data signal has been transmitted.

As a result, application of the contention-based uplink transmission control method using the "Contention Based Grant" is expected to be capable of a reduction in transmission delay of the uplink data signal by enabling omission of the L2 procedure of "transmission of scheduling request by mobile station UE"→"transmission of uplink scheduling grant by radio base station eNB", →"transmission of buffer status report by mobile station UE", →"transmission of uplink scheduling grant by radio base station eNB", →"transmission of uplink data signal by mobile station UE".

Application of contention-based uplink transmission control method using "Contention Based Grant" is expected to be capable of effective application to uplink resources that are not used after normal scheduling addressed to the C-RNTI.

SUMMARY OF THE INVENTION

Problems to be Solved by the Invention

However, the contention-based uplink transmission control method using the "Contention Based Grant" that is under current consideration entails the problem that it is not possible to determine whether the transmission of the uplink data signal by the mobile station UE itself is successful or whether the transmission of the uplink data signal using the same shared resource is successful when the mobile station UE has sent an uplink data signal using shared uplink resources designed by an uplink scheduling grant including CB-RNTI.

Therefore, the present invention has been achieved in view of the above-described problems and an object thereof is to provide a mobile communication method, a radio base station, and a mobile station, by which it is possible to confirm the transmission result of an uplink data signal transmitted using shared uplink resources designated by an uplink scheduling grant including CB-RNTI in a mobile station.

Means for Solving the Problem

A first characteristic of the present invention is summarized as a mobile communication method, comprising, a step A in which a mobile station transmits an uplink data signal using a shared uplink resource designated by an uplink scheduling signal to a radio base station upon reception of the uplink scheduling signal including predetermined identification information not being identification information of a designated mobile station from the radio base station, a step B in which the radio base station transmits a downlink control signal including the predetermined identification information on successful reception of the uplink data signal transmitted by the mobile station, and a step C in which the radio base station transmits a downlink data signal including identification information of the mobile station using a downlink resource designated by the downlink control signal.

A second characteristic of the present invention is summarized as a mobile communication method, comprising, a step A in which the mobile station transmits an uplink data signal using a shared uplink resource designated by an uplink scheduling signal to the radio base station upon reception of the uplink scheduling signal including predetermined identification information not being identification information of a designated mobile station from the radio base station, a step B in which the radio base station transmits a downlink control signal including identification information of the mobile station upon successful reception of the uplink data signal transmitted by the mobile station, and a step C in which the radio base station transmits the downlink data signal that indicates the successful reception of the uplink data signal using a downlink resource designated by the downlink control signal.

A third characteristic of the present invention is summarized as a radio base station, comprising, a downlink control signal transmission unit configured to transmit a downlink control signal including predetermined identification information when an uplink data signal transmitted by the mobile station UE is successfully received using a shared uplink resource designated by an uplink scheduling signal including predetermined identification information not being identification information of the designated mobile station, and a downlink data signal transmission unit configured to transmit a downlink data signal including identification information for the mobile station using a downlink resource designated by the downlink control signal.

A fourth characteristic of the present invention is summarized as a radio base station, comprising, a downlink control signal transmission unit configured to transmit a downlink control signal including identification information of the mobile station when an uplink data signal transmitted by the mobile station is successfully received using a shared uplink resource designated by an uplink scheduling signal including predetermined identification information not being identification information of the designated mobile station, and a downlink data signal transmission unit configured to transmit a downlink data signal indicating successful reception of the uplink data signal using the downlink resource designated by the downlink control signal.

A Fifth characteristic of the present invention is summarized as A mobile station, comprising, an uplink data signal transmission unit configured to transmit an uplink data signal using a shared uplink resource designated by an uplink scheduling signal to the radio base station when the uplink scheduling signal including predetermined identification information not being identification information for a designated mobile station is received from the radio base station, a downlink control signal reception unit configured to receive a downlink control signal including predetermined identification information from the radio base station, and a downlink data signal reception unit configured to receive a downlink data signal including identification information of the mobile station using a downlink resource designated by the downlink control signal from the radio base station, wherein the uplink data signal transmission unit is configured to determine that transmission of the uplink data signal has failed when the downlink data signal is not received within a predetermined period after transmission of the uplink data signal.

A sixth characteristic of the present invention is summarized as a mobile station, comprising, an uplink data signal transmission unit configured to transmit an uplink data signal using a shared uplink resource designated by an uplink scheduling signal to the radio base station when the uplink scheduling signal including predetermined identification information not being identification information for a designated mobile station is received from the radio base station, a downlink control signal reception unit configured to receive a downlink control signal including identification information of the mobile station from the radio base station, and a downlink data signal reception unit configured to receive a downlink data signal that indicates the successful reception of the uplink data signal using a downlink resource designated by the downlink control signal from the radio base station, in which the uplink data signal transmission unit is configured to determine that transmission of the uplink data signal has failed when the downlink data signal is not received within a predetermined period after transmission of the uplink data signal.

Effect of the Invention

As described above, according to the present invention, it is possible to provide a mobile communication method, a radio base station, and a mobile station, by which it is possible to confirm the transmission result of an uplink data signal transmitted using shared uplink resources designated by an uplink scheduling grant including CB-RNTI in a mobile station.

BRIEF DESCRIPTION OF THE DRAWINGS

FIG. 3 is a functional block diagram of the mobile station according to the first embodiment of the present invention.

FIG. 4 is the sequence diagram of operations in the mobile communication system according to the first embodiment of the present invention.

FIG. 5 illustrates an example of a MAC header assigned to MAC-CE transmitted by the radio base station according to a first modification of the present invention.

FIG. 6 is the sequence diagram of operations in the mobile communication system according to the first modification of the present invention.

BEST MODES FOR CARRYING OUT THE INVENTION

Configuration of Mobile Communication System According to First Embodiment of the Present Invention The configuration of a mobile communication system according to a first embodiment of the present invention will be described making reference to FIG. 1 to FIG. 4.

The mobile communication system according to the present embodiment is an LTE-Advanced mobile communication system that is configured to apply a contention-based uplink transmission control method using "Contention Based Grant" in relation to a mobile station UE that maintains an uplink synchronous state.

Figure 1:
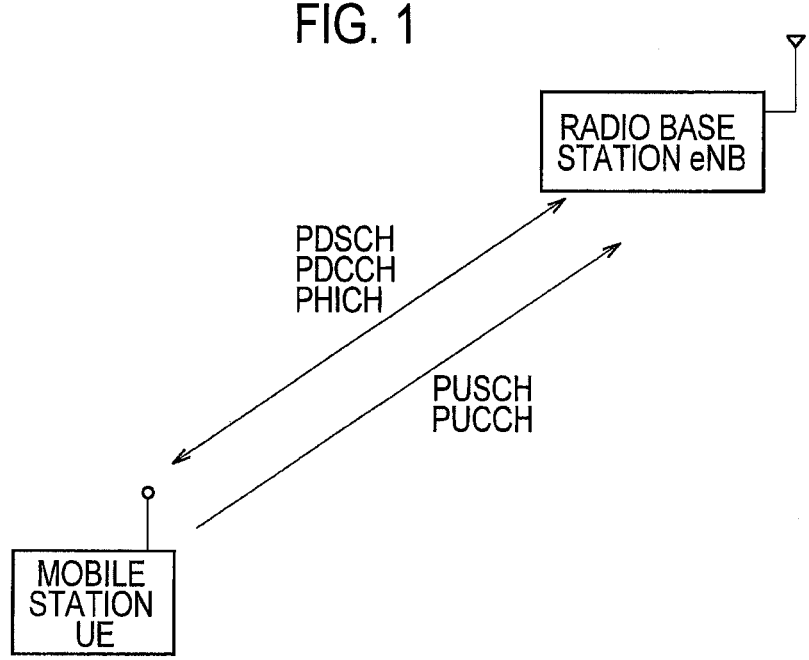
FIG. 1 is a diagram illustrating the entire configuration of a mobile communication system according to a first embodiment of the present invention.

As illustrated in FIG. 1, the mobile communication system according to the present embodiment is configured so that a mobile station UE transmits an uplink data signal through PUSCH to a radio base station eNB, and transmits an uplink control signal through PUCCH (Physical Uplink Control Channel).

In addition, the mobile communication system according to the present embodiment is configured so that the radio base station eNB transmits a downlink data signal through PDSCH (Physical Downlink Shared Channel) to the mobile station UE, transmits a downlink control signal through PDCCH, and transmits a transmission acknowledgement result (ACK/NACK) for the uplink data signal described above through PHICH (Physical HARQ Indicator Channel).

Figure 2:
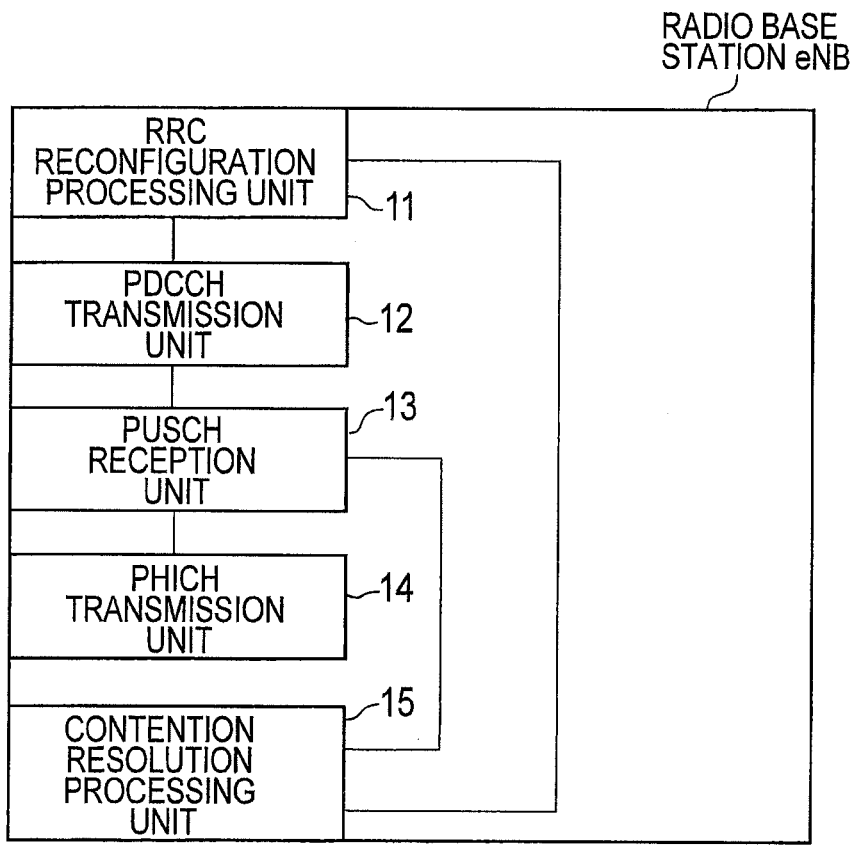
FIG. 2 is a functional block diagram of a radio base station according to the first embodiment of the present invention.

As illustrated in FIG. 2, the radio base station eNB includes an RRC reconfiguration processing unit 11, a PDCCH transmission unit 12, a PUSCH reception unit 13, a PHICH transmission unit 14, and a contention resolution processing unit 15.

The RRC reconfiguration processing unit 11 is configured to transmit an "RRC Reconfiguration" to the mobile station UE and to receive an "RRC Reconfiguration Complete" from the mobile station UE to thereby execute an RRC reconfiguration process on the RRC connection with the mobile station UE.

For example, the RRC reconfiguration processing unit 11 may be configured to notify a value of a CR timer as described below by the "RRC Reconfiguration" to the mobile station UE.

The PDCCH transmission unit 12 is configured to transmit an uplink scheduling grant through PDCCH addressed to C-RNTI of the mobile station UE as a downlink control signal, in other words, is configured to transmit an uplink scheduling grant (uplink scheduling signal) that designates the individual uplink resource including C-RNTI of the mobile station UE through PDCCH.

The PDCCH transmission unit 12 is configured to transmit an uplink scheduling grant through PDCCH addressed to CB-RNTI as a downlink control signal, in other words, is configured to transmit an uplink scheduling grant (uplink scheduling signal) that designates the shared uplink resource including CB-RNTI through PDCCH.

As used herein, since the uplink scheduling grant including C-RNTI of the mobile station UE designates the available uplink resources of only the mobile station UE, in the present specification, the uplink resources designated by that uplink scheduling grant are termed "individual uplink resources".

On the other hand, since the uplink scheduling grant including CB-RNTI designates the available uplink resources of a plurality of mobile stations UE, in the present specification, the uplink resources designated by that uplink scheduling grant are termed "shared uplink resources".

CB-RNTI is predetermined identification information that is not C-RNTI for a designated mobile station UE, and may be designated by broadcast information by the radio base station eNB, or may be designated by separate signaling by the radio base station eNB (for example, "RRC Reconfiguration" that is an RRC message).

The PUSCH reception unit 13 is configured to receive an uplink data signal transmitted using shared uplink resources or individual uplink resources by the mobile station UE through PUSCH.

Transmitting and receiving the uplink data signal described above between the mobile station UE and the radio mobile station eNB may be configured to be executed in parallel by a plurality of HARQ processes. In this case, identification information (process ID) for the HARQ process may be included in the MAC-CE (Control Element) assigned to the uplink data signal described above.

The PHICH transmission unit 14 is configured to transmit a transmission acknowledgement signal (ACK/NACK) through the PHICH to the mobile station UE to indicate the reception result of the uplink data signal from the mobile station UE in the PUSCH reception unit 13.

The contention resolution processing unit 15 is configured to notify the successful reception of the uplink data signal to the mobile station UE that transmitted the uplink data signal through the shared uplink resources that are designated by the uplink scheduling grant including CB-RNTI.

For example, the contention resolution processing unit 15 is configured to transmit downlink scheduling information including CB-RNTI through PDCCH on the successful reception of the uplink data signal as described above, and to transmit MAC-CE (downlink data signal) including C-RNTI of the mobile station UE through PDSCH using a downlink resource designated by downlink scheduling information.

When transmitting and receiving the uplink data signal described above between the mobile station UE and the radio mobile station eNB are executed in parallel by a plurality of HARQ processes, the contention resolution processing unit 15 may be configured to execute transmission in which further HARQ process identification information (process ID) in the mobile station UE that transmitted the uplink data signal above is included in MAC-CE as described above.

The contention resolution processing unit 15 is configured to execute a transmission in which the process ID included in MAC-CE that is assigned to the uplink data signal received by the PUSCH reception unit 13 is included in MAC-CE described above.

As illustrated in FIG. 3, the mobile station UE includes an RRC reconfiguration processing unit 21, a CR timer management unit 22, a PDCCH reception unit 23, a PUSCH transmission unit 24, a PHICH reception unit 25, and a PDSCH reception unit 26.

The RRC reconfiguration processing unit 21 is configured to execute an RRC reconfiguration process related to the RRC connection with the radio base station eNB.

For example, the RRC reconfiguration processing unit 21 may be configured to acquire a value of a CR timer, CB-RNTI, or the like though the "RRC Reconfiguration" that is transmitted by the radio base station eNB.

The CR timer management unit 22 is configured to manage the CR timer. For example, the CR timer management unit 22 is configured to manage a CR timer value that is acquired by the RRC reconfiguration processing unit 21 as a predetermined period.

For example, the CR timer management unit 22 is configured to activate the CR timer when sending an uplink data signal using a shared uplink resource by the PUSCH transmission unit 24, and to stop the CR timer when a predetermined period elapses without reception of MAC-CE including C-RNTI of the mobile station UE that is transmitted by the contention resolution processing unit 15 of the radio base station eNB.

The PDCCH reception unit 23 is configured to receive an uplink scheduling grant that is transmitted through the PDCCH addressed to the C-RNTI of the mobile station UE, in other words, it is configured to receive a first uplink scheduling grant including C-RNTI of the mobile station UE through PDCCH.

Furthermore, the PDCCH reception unit 23 is configured to receive an uplink scheduling grant that is transmitted through the PDCCH addressed to CB-RNTI, in other words, it is configured to receive a second uplink scheduling grant including CB-RNTI.

In addition, the PDCCH reception unit 23 is configured to receive downlink scheduling information including CB-RNTI.

The PUSCH transmission unit 24 is configured to transmit an uplink data signal through PUSCH using an individual uplink resource designated by an uplink scheduling grant including C-RNTI of the mobile station UE in relation to the radio mobile station eNB.

The PUSCH transmission unit 24 is configured to transmit an uplink data signal through PUSCH to the radio mobile station eNB using a shared uplink resource designated by an uplink scheduling grant including CB-RNTI.

As used herein, the PUSCH transmission unit 24 may be configured to transmit an uplink data signal using a shared uplink resource using a plurality of parallel HARQ processes. In that case, the PUSCH transmission unit 24 may be configured to execute a transmission included in the uplink data signal of MAC-CE that includes the HARQ process identification information (process ID) that transmits the uplink data signal.

The transmission of the process ID may be omitted by imposing a limitation of one on the number of HARQ processes that can transmit the uplink data signal in parallel with use of the shared uplink resource in a single mobile station UE.

The PUSCH transmission unit 24 may be configured to stop the transmission of the uplink data signal using the shared uplink resource and start transmission of the uplink data signal using the individual uplink resource if an individual uplink resource is assigned by the uplink scheduling grant including C-RNTI of the mobile station UE when the uplink data signal is transmitted using the shared uplink resource.

In this case, the shared uplink resource is not ineffective since it can be used by another mobile station UE.

The PHICH reception unit 25 is configured to receive a transmission acknowledgement result (ACK/NACK) through PHICH that indicates a reception result for the uplink data signal transmitted by the PUSCH transmission unit 24.

The PUSCH transmission unit 24 is configured to receive MAC-CE that includes C-RNTI of the mobile station UE using a downlink resource designated by downlink scheduling information including CB-RNTI received by the PDCCH reception unit 23.

The PUSCH transmission unit 24 may be configured to determine failure in the transmission of the uplink data signal when MAC-CE that includes C-RNTI of the mobile station UE as described above is not received within a predetermined period after the transmission of the uplink data signal using the shared uplink resource by the PUSCH transmission unit 24.

After a determination that the transmission of the uplink data signal has failed, if an uplink scheduling grant including C-RNTI of the mobile station UE or CB-RNTI is received, the PUSCH transmission unit 24 may be configured to retransmit the uplink data signal using a shared uplink resource or individual uplink resource designated by the uplink scheduling grant.

Furthermore, upon transmission of the uplink data signal, the PUSCH transmission unit 24 may be configured to retain MAC-PDU that configures the uplink data signal and after a determination that the transmission of the uplink data signal has failed, to execute a retransmission process on the MAC layer when the size of the MAC-PDU is contained in the PDU size designated by the received uplink scheduling grant.

The maximum number of retransmission operations in a retransmission process on the MAC layer may be notified from the radio base station eNB to the mobile station UE in the RRC reconfiguration process.

The PUSCH transmission unit 24 may be configured to execute a retransmission process on the RLC layer in substitution for a retransmission process on the MAC layer.

Furthermore, the PUSCH transmission unit 24 may be configured to transmit the uplink data signal using a shared uplink resource only in relation to the logical channel that applies RLC-AM.

(Operation of Mobile Communication System According to First Embodiment of the Present Invention)

The operation of the mobile communication system according to the first embodiment of the present invention will be described making reference to FIG. 4.

As illustrated in FIG. 4, in step S1001, the radio base station eNB transmits "RRC Reconfiguration" that indicates a CR timer value and CB-RNTI to the mobile station UE.

In step S1002, the mobile station UE transmits "RRC Reconfiguration Complete" to the radio base station eNB.

In step S1010, the radio base station eNB transmits an uplink scheduling grant including CB-RNTI through PDCCH to the mobile station UE.

In step S1011, the mobile station UE transmits an uplink data signal including addition of MAC-CE including C-RNTI and the process ID through PUSCH to the radio base station eNB.

When reception of the uplink data signal has failed, in step S1012, the radio base station eNB sends HARQ-NACK through PHICH to the mobile station UE.

In step S1013, the mobile station UE executes a retransmission in the MAC layer in response to the received HARQ-NACK, that is to say, the uplink data signal with addition of MAC-CE including C-RNTI and the process ID is resent though PUSCH to the radio base station eNB.

When reception of the uplink data signal is successful, in step S1014, the radio base station eNB transmits the HARQ-ACK through PHICH to the mobile station UE.

In step S1015, the radio base station eNB transmits downlink scheduling information including CB-RNTI though PDCCH to the mobile station UE, and in step S1016, transmits MAC-CE including the processing ID and C-RNTI of the mobile station UE through PDSCH using a downlink resource designated by the downlink scheduling information.

When MAC-CE has been received, the mobile station UE determines that transmission of the uplink data signal transmitted using a shared uplink resource by the mobile station UE itself in step S1013 has been successful.

(Operation and Effect of the Mobile Communication System According to First Embodiment of the Present Invention)

In the mobile communication system according to the first embodiment of the present invention, the mobile station UE can confirm a transmission result of an uplink data signal transmitted by the mobile station UE itself using a shared uplink resource depending on the presence or absence of the reception of MAC-CE including C-RNTI of the mobile station UE.

First Modification

Figure 5:
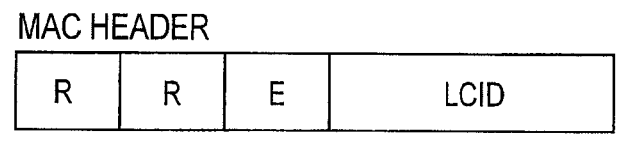

A mobile communication system according to a first modification will be described below with reference to FIG. 5 and FIG. 6 with particular reference to the points of difference from the mobile communication system according to the first embodiment above.

The mobile communication system according to the first modification is configured so that the contention resolution processing unit 15 of the radio base station eNB transmits downlink scheduling information including C-RNTI of the mobile station UE upon successful reception of the uplink data signal transmitted by the mobile station UE using the shared uplink resource designated by the uplink scheduling grant including CB-RNTI.

Furthermore, the contention resolution processing unit 15 of the radio base station eNB is configured to transmit MAC-CE that indicates successful reception of the uplink data signal described above using the downlink resource designated by the downlink scheduling information described above.

For example, as described in FIG. 6, MAC-CE may set a designated value as the value for LCID (Logical Channel ID) of the MAC header portion with the data portion being empty.

A flag (for example, one bit) may be set in the downlink scheduling information described above to indicate the successful reception of the uplink data signal transmitted by the mobile station UE. In this case, the transmission of the MAC-CE described above may be omitted.

HARQ process identification information (process ID) in the mobile station UE that transmits the uplink data signal described above may be included in MAC-CE described above.

The PDCCH reception unit 23 of the mobile station UE is configured to receive the downlink scheduling information including C-RNTI of the mobile station UE from the radio base station eNB.

The PDSCH reception unit 26 of the mobile station UE is configured to receive the MAC-CE indicating successful reception from the radio base station eNB of the uplink data signal described above using a downlink resource designated by the downlink scheduling information.

The operation of the mobile communication system according to the first modification will be described with reference to FIG. 6.

As illustrated in FIG. 6, the operation in step S2001 to S2014 is the same operation as that in step S1001 to S1014 as illustrated in FIG. 4.

The radio base station eNB transmits downlink scheduling information including C-RNTI of the mobile station UE through PDCCH in step S2015 to the mobile station UE, and in step S2016, indicates the successful reception of the uplink data signal that is transmitted by the mobile station UE in step S2013 through PDSCH using a downlink resource designated by the downlink scheduling information, and transmits MAC-CE including the process ID of the HARQ process used at that time.

When the MAC-CE is received, the mobile station UE determines that transmission of the uplink data signal transmitted using shared uplink resources by the mobile station UE itself in step S2013 has been successful.

The characteristics of the present embodiment as described above may be expressed as follows.

A first characteristic of the present embodiment is summarized as a mobile communication method that includes a step A in which the mobile station UE transmits an uplink data signal using a shared uplink resource designated by an uplink scheduling grant to the radio base station eNB upon reception of an uplink scheduling grant (uplink scheduling signal) including CB-RNTI (predetermined identification information not being identification information of a designated mobile station) from the radio base station eNB, a step B in which the radio base station eNB transmits downlink scheduling information (downlink control signal) including CB-RNTI on successful reception of the uplink data signal transmitted by the mobile station UE, and a step C in which the radio base station eNB transmits MAC-CE (downlink data signal) including C-RNTI of the mobile station UE using a downlink resource designated by the downlink scheduling information.

In the first characteristic of the present embodiment, in the step C, the MAC-CE may further include HARQ process identification information transmitting the uplink data signal in the step A.

The first characteristic of the present embodiment may further include a step in which the mobile station UE determines that transmission of the uplink data signal in the step A has failed when MAC-CE described above is not received within a predetermined period after transmission of the uplink data signal in the step A.

The first characteristic of the present embodiment may include a further step in which the mobile station UE retransmits the uplink data signal using a shared uplink resource or an individual uplink resource designated by an uplink scheduling grant when the uplink scheduling grant including C-RNTI of the mobile station UE or CB-RNTI is received after it is determined that the transmission of the uplink data signal in the step A has failed.

A second characteristic of the present embodiment is summarized as a mobile communication method that includes a step A in which the mobile station UE transmits an uplink data signal using a shared uplink resource designated by an uplink scheduling grant to the radio base station eNB upon reception of an uplink scheduling grant including CB-RNTI from the radio base station eNB, a step B in which the radio base station eNB transmits downlink scheduling information including C-RNTI of the mobile station UE upon successful reception of the uplink data signal transmitted by the mobile station UE, and a step C in which the radio base station eNB transmits MAC-CE that indicates the successful reception of the uplink data signal using a downlink resource designated by downlink scheduling information.

In the second characteristic of the present embodiment, in the step C, the MAC-CE may further include HARQ process identification information transmitting the uplink data signal in the step A.

The second characteristic of the present embodiment may further include a step in which the mobile station UE determines that transmission of the uplink data signal in the step A has failed when MAC-CE described above is not received within a predetermined period after transmission of the uplink data signal in the step A.

The second characteristic of the present embodiment may further include a step in which the mobile station UE retransmits the uplink data signal using a shared uplink resource or an individual uplink resource designated by an uplink scheduling grant when the uplink scheduling grant including C-RNTI of the mobile station UE or CB-RNTI is received after it is determined that the transmission of the uplink data signal in the step A has failed.

A third characteristic of the present embodiment is summarized as a radio base station eNB provided with a contention resolution processing unit 15 configured to transmit MAC-CE including C-RNTI of the mobile station UE using a downlink resource designated by downlink scheduling information, and to transmit downlink scheduling information including CB-RNTI when the uplink data signal transmitted by the mobile station UE is successfully received using a shared uplink resource designated by the uplink scheduling grant including CB-RNTI.

The contention resolution processing unit 15 in the third characteristic of the present embodiment may be configured to transmit MAC-CE that further includes HARQ process identification information in the mobile station UE that has transmitted the uplink data signal described above.

A fourth characteristic of the present embodiment is summarized as a radio base station eNB provided with a contention resolution processing unit 15 configured to transmit MAC-CE to indicate the successful reception of the uplink data signal using a downlink resource designated by the downlink scheduling information, and to transmit downlink scheduling information including C-RNTI of the mobile station UE when the uplink data signal transmitted by the mobile station UE is successfully received using a shared uplink resource designated by the uplink scheduling grant including CB-RNTI.

The contention resolution processing unit 15 in the fourth characteristic of the present embodiment may be configured to transmit MAC-CE that further includes HARQ process identification information in the mobile station UE that has transmitted the uplink data signal described above using a downlink resource designated by the downlink scheduling information described above.

A fifth characteristic of the present embodiment is summarized as a mobile station UE provided with a PUSCH transmission unit 24 that is configured to transmit an uplink data signal using a shared uplink resource designated by an uplink scheduling grant to a radio base station eNB when an uplink scheduling grant including CB-RNTI is received from the radio base station eNB, a PDCCH reception unit 23 that is configured to receive downlink scheduling information including CB-RNTI from the radio base station eNB, and a PDSCH reception unit 26 configured to receive MAC-CE including C-RNTI of the mobile station UE using a downlink resource designated by the downlink scheduling information from the radio base station eNB. The PUSCH transmission unit 24 is configured to determine that transmission of the uplink data signal has failed when MAC-CE described above is not received within a predetermined period after transmission of the uplink data signal described above.

In the fifth characteristic of the present embodiment, the PUSCH transmission unit 24 may be configured so that the uplink data signal is retransmitted using a shared uplink resource or an individual uplink resource designated by an uplink scheduling grant when the uplink scheduling grant including C-RNTI of the mobile station UE or CB-RNTI is received after determination that the transmission of the uplink data signal described above has failed.

A six characteristic of the present embodiment is summarized as a mobile station UE provided with a PUSCH transmission unit 24 that is configured to transmit an uplink data signal using a shared uplink resource designated by an uplink scheduling grant to the radio base station eNB when an uplink scheduling grant including CB-RNTI is received from the radio base station eNB, a PDCCH reception unit 23 that is configured to receive downlink scheduling information including C-RNTI of the mobile station UE from the radio base station eNB, and a PDSCH reception unit 26 configured to receive MAC-CE that indicates successful reception of the uplink data signal described above using a downlink resource designated by the downlink scheduling information from the radio base station eNB. The PUSCH transmission unit 24 is configured to determine that transmission of the uplink data signal has failed when MAC-CE described above is not received within a predetermined period after transmission of the uplink data signal described above.

In the sixth characteristic of the present embodiment, the PUSCH transmission unit 24 may be configured so that the uplink data signal is retransmitted using a shared uplink resource or an individual uplink resource designated by an uplink scheduling grant when the uplink scheduling grant including C-RNTI of the mobile station UE or the CB-RNTI is received after determination that the transmission of the uplink data signal described above has failed.

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method, comprising:
a step A in which a mobile station transmits an uplink data signal using a shared uplink resource designated by an uplink scheduling signal to a radio base station, upon reception of the uplink scheduling signal from the radio base station, the uplink scheduling signal including a CB-RNTI (Connection Based-Radio Network Temporary Identity) which is not a C-RNTI (Cell-Radio Network Temporary Identity) identifies an uplink scheduling signal designating a dedicated uplink resource usable by a dedicated mobile station;

a step B in which the radio base station transmits a downlink control signal including the CB-RNTI on successful reception of the uplink data signal transmitted by the mobile station; and a step C in which the radio base station transmits a downlink data signal including the C-RNTI of the mobile station using a downlink resource designated by the downlink control signal.

2. The mobile communication method according to claim 1, wherein in the step C, the downlink data signal further comprises HARQ process identification information transmitting the uplink data signal in the step A.

3. The mobile communication method according to claim 1, further comprising a step D in which the mobile station determines that transmission of the uplink data signal in the step A has failed when the downlink data signal is not received within a predetermined period after transmission of the uplink data signal in the step A.

4. The mobile communication method according to claim 1, further comprising a step in which the mobile station retransmits the uplink data signal using a shared uplink resource or a dedicated uplink resource designated by the uplink scheduling signal when the uplink scheduling signal including identification information of the mobile station or predetermined identification information is received after it is determined that the transmission of the uplink data signal in the step A has failed.

5. A mobile communication method, comprising:
a step A in which the mobile station transmits an uplink data signal using a shared uplink resource designated by an uplink scheduling signal to the radio base station upon reception of the uplink scheduling signal from the radio base station, the uplink scheduling signal including a CB-RNTI (Connection Based-Radio Network Temporary Identity) which is not a C-RNTI (Cell-Radio Network Temporary Identity) identifies an uplink scheduling signal designating a dedicated uplink resource usable by a dedicated mobile station;

a step B in which the radio base station transmits a downlink control signal including the C-RNTI of the mobile station upon successful reception of the uplink data signal transmitted by the mobile station; and a step C in which the radio base station transmits the downlink data signal that indicates the successful reception of the uplink data signal using a downlink resource designated by the downlink control signal.

6. The mobile communication method according to claim 5, wherein in the step C, the downlink data signal further comprises HARQ process identification information transmitting the uplink data signal in the step A.

7. The mobile communication method according to claim 5, further comprising a step D in which the mobile station determines that transmission of the uplink data signal in the step A has failed when the downlink data signal is not received within a predetermined period after transmission of the uplink data signal in the step A.

8. The mobile communication method according to claim 5, further comprising a step in which the mobile station retransmits the uplink data signal using a shared uplink resource or a dedicated uplink resource designated by the uplink scheduling signal when the uplink scheduling signal including identification information of the mobile station or predetermined identification information is received after it is determined that the transmission of the uplink data signal in the step A has failed.

9. A radio base station, comprising:
a downlink control signal transmission unit configured to transmit a downlink control signal to a mobile station, the downlink control signal including a CB-RNTI (Connection Based-Radio Network Temporary Identity) which is not a C-RNTI (Cell-Radio Network Temporary Identity) identifies an uplink scheduling signal designating a dedicated uplink resource usable by a dedicated mobile station, when an uplink data signal transmitted by the mobile station is successfully received using a shared uplink resource designated by an uplink scheduling signal including the CB-RNTI; and
a downlink data signal transmission unit configured to transmit a downlink data signal including the C-RNTI of for the mobile station using a downlink resource designated by the downlink control signal.

10. The radio base station according to claim 9, wherein the downlink data signal transmission unit is configured to transmit a downlink data signal that further includes HARQ process identification information for the mobile station transmitting the uplink data signal.

11. A radio base station, comprising:
a downlink control signal transmission unit configured to transmit a downlink control signal to a mobile station, the downlink control signal including a C-RNTI (Cell-Radio Network Temporary Identity) identifies an uplink scheduling signal designating a dedicated uplink resource usable by a dedicated mobile station, when an uplink data signal transmitted by the mobile station is successfully received using a shared uplink resource designated by an uplink scheduling signal including a CB-RNTI (Connection Based-Radio Network Temporary Identity) which is not a C-RNTI; and
a downlink data signal transmission unit configured to transmit a downlink data signal indicating successful reception of the uplink data signal using the downlink resource designated by the downlink control signal.

12. The radio base station according to claim 11, wherein the downlink data signal transmission unit is configured to transmit a downlink data signal that further includes HARQ process identification information for the mobile station transmitting the uplink data signal.

13. A mobile station, comprising:
an uplink data signal transmission unit configured to transmit an uplink data signal using a shared uplink resource designated by an uplink scheduling signal to the radio base station when the uplink scheduling signal is received from the radio base station, the uplink scheduling signal including a CB-RNTI (Connection Based-Radio Network Temporary Identity) which is not a C-RNTI (Cell-Radio Network Temporary Identity) identifies an uplink scheduling signal designating a dedicated uplink resource usable by a dedicated mobile station;
a downlink control signal reception unit configured to receive a downlink control signal including a CB-RNTI from the radio base station; and
a downlink data signal reception unit configured to receive a downlink data signal including a C-RNTI of the mobile station using a downlink resource designated by the downlink control signal from the radio base station; wherein
the uplink data signal transmission unit is configured to determine that transmission of the uplink data signal has failed when the downlink data signal is not received within a predetermined period after transmission of the uplink data signal.

14. The mobile station according to claim 13, wherein the uplink data signal transmission unit is configured to retransmit the uplink data signal using a shared uplink resource or a dedicated uplink resource designated by the uplink scheduling signal when the uplink scheduling signal including the C-RNTI of the mobile station or the CB-RNTI is received after it is determined that the transmission of the uplink data signal has failed.

15. A mobile station, comprising:
an uplink data signal transmission unit configured to transmit an uplink data signal using a shared uplink resource designated by an uplink scheduling signal to the radio base station when the uplink scheduling signal is received from the radio base station, the uplink scheduling signal including a CB-RNTI (Connection Based-Radio Network Temporary Identity) which is not a C-RNTI (Cell-Radio Network Temporary Identity) identifies an uplink scheduling signal designating a dedicated uplink resource usable by a dedicated mobile station;
a downlink control signal reception unit configured to receive a downlink control signal including a C-RNTI of the mobile station from the radio base station; and
a downlink data signal reception unit configured to receive a downlink data signal that indicates the successful reception of the uplink data signal using a downlink resource designated by the downlink control signal from the radio base station, wherein
the uplink data signal transmission unit is configured to determine that transmission of the uplink data signal has failed when the downlink data signal is not received within a predetermined period after transmission of the uplink data signal.

16. The mobile station according to claim 15, wherein the uplink data signal transmission unit is configured to retransmit the uplink data signal using a shared uplink resource or a dedicated uplink resource designated by the uplink scheduling signal when the uplink scheduling signal including the C-RNTI of the mobile station or the CB-RNTI is received after it is determined that the transmission of the uplink data signal has failed.

* * * * *